(12) United States Patent
Fuse et al.

(10) Patent No.: US 10,377,937 B2
(45) Date of Patent: Aug. 13, 2019

(54) HEAT TRANSFER SYSTEM

(71) Applicant: DENSO CORPORATION, Kariya, Aichi-pref. (JP)

(72) Inventors: Takuya Fuse, Kariya (JP); Touru Kawaguchi, Kariya (JP); Hajime Shingai, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 15/740,395

(22) PCT Filed: Jul. 5, 2016

(86) PCT No.: PCT/JP2016/069845
§ 371 (c)(1),
(2) Date: Dec. 28, 2017

(87) PCT Pub. No.: WO2017/029897
PCT Pub. Date: Feb. 23, 2017

(65) Prior Publication Data
US 2018/0194980 A1 Jul. 12, 2018

(30) Foreign Application Priority Data
Aug. 19, 2015 (JP) .................... 2015-161618

(51) Int. Cl.
*B60H 1/00* (2006.01)
*C09K 5/10* (2006.01)
(Continued)

(52) U.S. Cl.
CPC ........... *C09K 5/10* (2013.01); *B60H 1/00885* (2013.01); *B60K 11/02* (2013.01); *C09K 5/20* (2013.01);
(Continued)

(58) Field of Classification Search
CPC ............... B60L 1/003; B60L 2240/36; B60L 2240/525; B60H 1/00885; B60K 11/02;
(Continued)

(56) References Cited

U.S. PATENT DOCUMENTS

| 4,708,812 | A | * | 11/1987 | Hatfield | ............... | B01J 13/16 |
| | | | | | | 118/62 |
| 6,447,692 | B1 | * | 9/2002 | Momoda | ............... | C09K 5/063 |
| | | | | | | 16/10 |
| 2003/0071242 | A1 | * | 4/2003 | Evans | ............... | C09K 5/10 |
| | | | | | | 252/73 |

FOREIGN PATENT DOCUMENTS

| CN | 1470592 A | 1/2004 |
| JP | 2011-121551 A | 6/2011 |
| JP | 2014-020280 A | 2/2014 |

* cited by examiner

*Primary Examiner* — Davis D Hwu
(74) *Attorney, Agent, or Firm* — Posz Law Group, PLC

(57) ABSTRACT

A heat transfer system has an energy converter, a heat transfer medium, a transfer part, and a heat exchanger. The energy converter converts an energy of an energy source into an energy in a different state and generates a heat while converting the energy. The heat transfer medium is in a liquid state and receives the heat from the energy converter. The heat exchanger dissipates the heat from the heat transfer medium to an outside of the heat transfer system. The heat transfer medium contains $H_2O$ and a solute compatible with the $H_2O$. The solute has a molecular structure including two hydroxyl groups. A length of a binding chain between an oxygen atom of one of the two hydroxyl groups and an oxygen atom of an other of the two hydroxyl groups is shorter than a length of a binding chain between two hydroxyl groups of an ethylene glycol molecule.

6 Claims, 3 Drawing Sheets

(51) Int. Cl.
*C09K 5/20* (2006.01)
*F28F 17/00* (2006.01)
*F25D 9/00* (2006.01)
*B60K 11/02* (2006.01)
*B60L 1/00* (2006.01)
*F01P 3/00* (2006.01)

(52) U.S. Cl.
CPC ................ F25D 9/00 (2013.01); F28F 17/00 (2013.01); *B60L 1/003* (2013.01); *B60L 2240/36* (2013.01); *B60L 2240/525* (2013.01); *F01P 2003/001* (2013.01)

(58) Field of Classification Search
CPC ...... F01P 2003/001; B01L 13/16; C09K 5/10; C09K 5/063; C09K 5/20; F25D 9/00; F28F 17/00
USPC ........................................................ 165/202
See application file for complete search history.

| | PERFORMANCE | | | QUALITY |
|---|---|---|---|---|
| | λ | μ | Tm | |
| COOLING WATER | ○ | ○ - ◎ | ◎ | DETERIORATED STABILITY AND CORROSION OCCURS |
| ETHYLENE GLYCOL WATER SOLUTION | △ | △ | ◎ | STABLE AND ABLE TO HAVE ANTICORROSIVE CAPABILITY |
| WATER | ◎ | ◎ | × | STABLE AND LOW COST |

HEAT TRANSFER SYSTEM

CROSS REFERENCE TO RELATED APPLICATIONS

This application is a U.S. national stage of International Patent Application No. PCT/JP2016/069845 filed on Jul. 5, 2016 and is based on and claims the benefit of priority from Japanese Patent Application No. 2015-161618 filed on Aug. 19, 2015. The entire disclosures of the application are incorporated herein by reference.

TECHNICAL FIELD

The present disclosure relates to a heat transport system that transfers a heat using a liquid heat transfer medium.

BACKGROUND ART

A heat transfer system, which is mounted to a vehicle for example, tends to have a cooling circuit. For example, the cooling circuit has a heat transfer medium, a heat exchanging part, and a heat transfer part. The heat transfer medium removes a heat at least from a heat source (e.g., an energy converter). The heat exchanging part dissipates the heat of the heat transfer medium to an outside of the heat transfer system. The heat transfer part delivers the heat transfer medium from the heat source to the heat exchanging part. With the above-described configuration, the heat is transferred from the heat source to the outside of the heat transfer system.

PRIOR ART LITERATURES

Patent Literature

Patent Literature 1: JP 2014-020280 A

SUMMARY OF INVENTION

Here, the heat transfer medium is required to have antifreeze capability such that the heat transfer system is operated in a cold environment. A freezing point of the heat transfer medium is generally lowered by using an ethylene glycol water solution. Ethylene glycol has a small thermal conductivity and a large viscosity. Accordingly, the heat transfer medium, which is currently used, has antifreeze capability however a heat transfer performance may deteriorate.

On the other hand, a variety of the energy converter is being diversified, whereby heat is required to be removed more effectively. When considering using the heat transfer medium, which is currently used, a size of a heat exchanger may increase and a power of the heat transfer part may increase. Then, instead of ethylene glycol water solution, a new heat transfer medium, which has antifreeze capability and exerts a great heat transfer performance, is required.

The present disclosure addresses the above-described issues, and thus it is an objective of the present disclosure to provide a heat transfer system using a heat transfer medium which has an antifreeze capability comparable with that of an ethylene glycol water solution and exerts a greater heat transfer performance than the ethylene glycol water solution.

A heat transfer system has an energy converter, a heat transfer medium, a transfer part, and a heat exchanger. The energy converter converts an energy of an energy source into an energy in a different state and generates a heat while converting the energy. The heat transfer medium is in a liquid state and receives the heat from the energy converter. The transfer part circulates the heat transfer medium. The heat exchanger dissipates the heat from the heat transfer medium, which flows from the transfer part, to an outside of the heat transfer system.

The heat transfer medium contains at least $H_2O$ and a solute that is compatible with the $H_2O$. The solute has a molecular structure that includes at least two hydroxyl groups. A length of a binding chain between an oxygen atom of one of the two hydroxyl groups and an oxygen atom of an other of the two hydroxyl groups is shorter than a length of a binding chain between two hydroxyl groups of an ethylene glycol molecule.

According to the above-described configuration, the solute breaks an arrangement of $H_2O$, whereby the heat transfer medium can have antifreeze capability comparable with that of ethylene glycol. In addition, the heat transfer medium can have a thermal conductivity and a viscosity comparable with those of water and further can have a freezing point comparable with that of ethylene glycol. Therefore, the present disclosure can provide the heat transfer system that uses the heat transfer medium having an antifreeze capability comparable with that of an ethylene glycol water solution and exerting a greater heat transfer performance than the ethylene glycol water solution.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
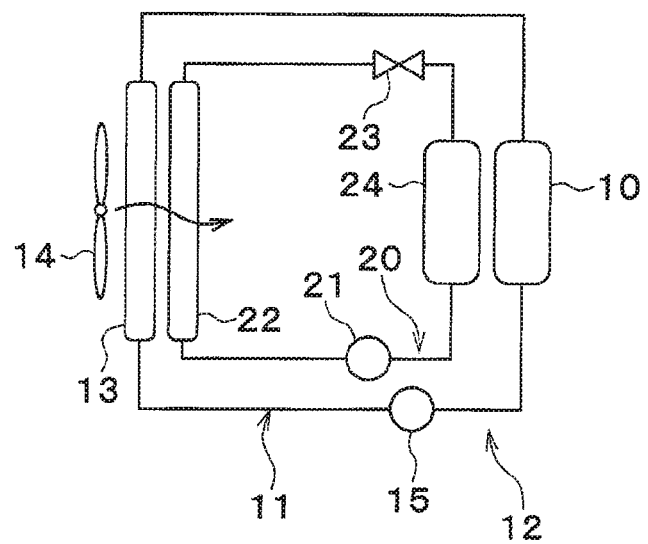
FIG. 1 is a configuration diagram illustrating a heat transfer system according to an embodiment.

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

An embodiment will be described hereafter referring to the drawings. A heat transfer system of the present embodiment may be mounted to a hybrid vehicle.

As shown in FIG. 1, the heat transfer system has a cooling water circuit 12 and a refrigerant circuit 20. A cooling water 11, which is used in a cooling system that cools an energy converter 10, circulates in the cooling water circuit 12. A refrigerant, which is used in a vapor-compression refrigeration cycle that configures a vehicle air conditioner, circulates in the refrigerant circuit 20.

The cooling system includes a radiator 13 in which the cooling water flowing in the energy converter 10 is cooled. That is, the cooling system transfers a heat from the energy converter 10 to the radiator 13 through the cooling water 11.

The energy converter 10 converts an energy of an energy source into an energy in a different state and generates the heat while converting the energy. For example, the energy converter 10 is a fuel cell, an engine, an inverter, or a motor generator. For example, the energy source is a fuel or electricity. The energy in the different state is, for example, power or electricity.

The radiator 13 is a heat exchanger that dissipates the heat of the cooling water 11 to an outside of the heat transfer system. Specifically, the radiator 13 dissipates the heat by performing a heat exchange between the cooling water 11, which is heated by an exhaust heat generated by the energy converter 10 thereby having a high temperature, and an outside air, which is blown by a blower fan 14. That is, the cooling water 11 is a liquid and receives the heat generated by the energy converter 10.

The energy converter 10 and the radiator 13 are connected to each other by the cooling water circuit 12 that configures a closed circuit between the energy converter 10 and the radiator 13. The cooling water circuit 12 mounts a pump 15. The pump 15 is a fluid machine that draws and discharges the cooling water 11.

The pump 15 is an electric pomp that is operated by an electric motor. The pump 15 serves as a flow controller that controls a flow of the cooling water 11 in the cooling water circuit 12. That is, the pump 15 circulates the cooling water 11 in the cooling water circuit 12.

The cooling water 11 in the cooling water circuit 12 flows out of the energy converter 10 from a cooling water outlet, flows through the radiator, and then flows into the energy converter 10 from a cooling water inlet. Thus, the radiator 13 dissipates the heat from the cooling water 11, which flows from the pump 15, to the outside of the heat transfer system.

The vapor-compression refrigeration cycle cools an air (i.e., a blown air) that is blown into a vehicle compartment. The vehicle compartment is an air conditioning target space. The refrigerant circuit 20 of the refrigeration cycle includes a compressor 21, a condenser 22, an expansion valve 23, and an evaporator 24.

The compressor 21 draws the refrigerant, compresses the refrigerant, and then discharges the refrigerant. The compressor 21 is configured as an electric compressor that operates a fixed-capacity compression mechanism, a discharge capacity of which is fixed, by an electric motor.

The condenser 22 is a heat exchanger that condenses a high-pressure refrigerant discharged from the compressor 21 by performing a heat exchange between the high-pressure refrigerant and the cooling water 11 circulating in the cooling water circuit 12. The condenser 22 emits a condensation heat, which is generated when the high-pressure refrigerant (i.e., a vapor-phase refrigerant) is condensed, to the cooling water 11.

The expansion valve 23 is a pressure reducer that decompresses and expands a liquid-phase refrigerant, which flows from the condenser 22, to be a low-pressure refrigerant. The evaporator 24 is a heat exchanger that evaporates the low-pressure refrigerant by performing a heat exchange between the low-pressure refrigerant and air. The evaporator 24 generates a cold heat by evaporating the low-pressure refrigerant (i.e., the liquid-phase refrigerant) and emits the cold heat to the air blown into the vehicle compartment. A gas-phase refrigerant generated in the evaporator 24 is drawn into the compressor 21 and compressed in the compressor 21.

A structure of the cooling water 11 will be described hereafter. The cooling water 11 contains $H_2O$ and a solute that is compatible with $H_2O$. The solute is a freezing-point depression agent. The solute has a molecular structure that includes at least two hydroxyl groups. For example, the solute is $H_2O_2$. That is, the molecular structure of the solute according to the example is expressed by the following chemical formula (1).

[Chemical Formula 1]

$$HO-OH \tag{1}$$

Figure 2:
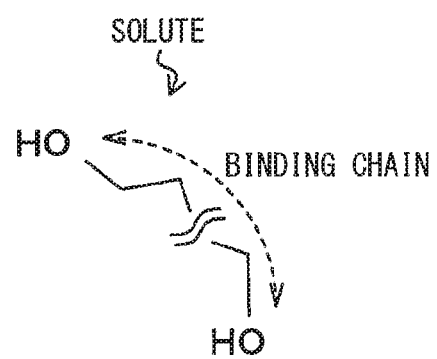
FIG. 2 is a diagram explaining a structure of a binding chain of a solute.

As shown in FIG. 2, a length of a binding chain between an oxygen atom of one of the two hydroxyl groups and an oxygen atom of an other of the two hydroxyl groups in the molecular structure of the solute is shorter than a length of a binding chain between two hydroxyl groups of an ethylene glycol molecule.

Figures 3, 4:
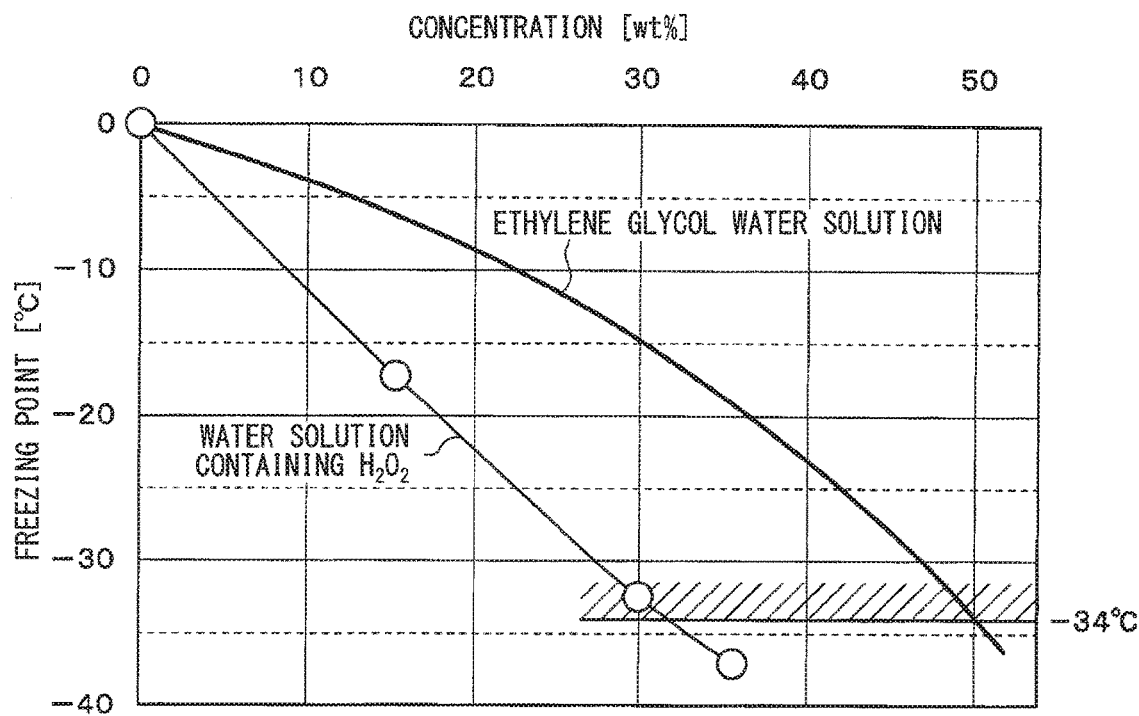
FIG. 3 is a diagram comparing performances and qualities among a cooling water, an ethylene glycol water solution, and water according to the embodiment.
FIG. 4 is a diagram illustrating a correlative relationship between a freezing point of the cooling water and a concentration of the solute.

According to the above-described molecular structure, the solute contained in the cooling water 11 breaks an arrangement of $H_2O$, whereby the cooling water 11 can have an antifreeze capability (i.e., an antifreeze function) comparable with that of an ethylene glycol water solution. Furthermore, as shown in FIG. 3, the cooling water 11 can have a thermal conductivity ($\lambda$) and a similar viscosity ($\mu$) comparable with those of water. In addition, a freezing point (Tm) of the cooling water 11 can be comparable with that of ethylene glycol.

When using an ethylene glycol water solution, a stable quality can be secured and an anticorrosion capability can be obtained. When using water, a stable quality can be secured with a low cost. However, the ethylene glycol water solution alone and water alone cannot have all of a great thermal conductivity, an appropriate viscosity, and a low freezing point at the same time.

Here, it is considered to shorten the length of the binding chain of the solute as described above, however a bond of the solute becomes unstable and whereby stability against decomposition is required to be secured. That is, the cooling water 11 may have a lower stability and corrosion may occur easily in the cooling water 11 as compared to the ethylene glycol water solution and water. Then, it is considered to treat the cooling water 11 to have a certain quality preferably.

For the certain quality, a concentration of the solute in the cooling water 11 is adjusted to obtain the antifreeze capability comparable to the ethylene glycol water solution. As shown in FIG. 4, a concentration of ethylene glycol in the ethylene glycol water solution is required to be 50 wt % or higher to obtain a target freezing point, e.g., −34° C. On the other hand, when using $H_2O_2$ as the solute of the cooling water 11, the cooling water 11 can have the antifreeze capability, which is comparable with that of the ethylene glycol water solution, by adjusting the concentration of the solute in the cooling water 11 to be 30 wt % or higher.

In addition, a retarding agent that retards a decomposition reaction of the solute is added to the cooling water 11. For example, the retarding agent is an OH-radical scavenger such as a chelate agent, Ta ion, or an organic acid. The OH-radical scavenger may be one of the chelate agent, Ta ion, and the organic acid or may be a combination of the chelate agent, Ta ion, and the organic acid. A concentration of the retarding agent in the cooling water 11 is one-tenth of the concentration of the solute in the cooling water 11 or smaller.

Figure 5:
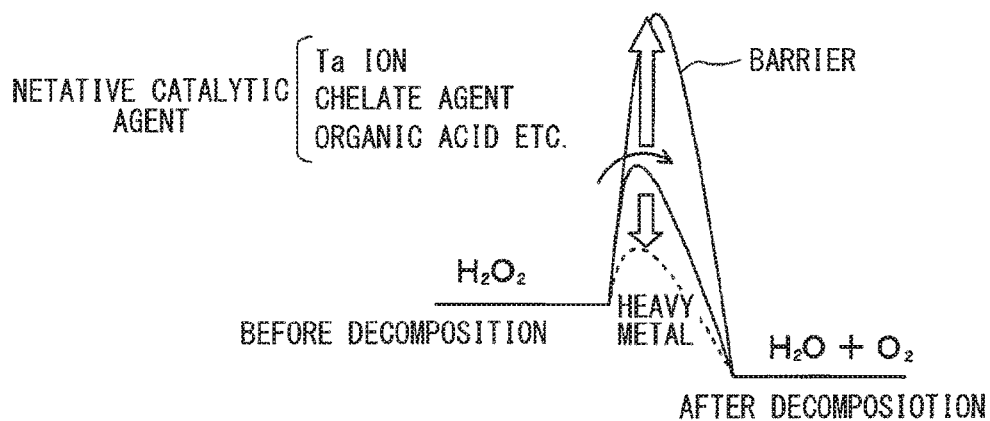
FIG. 5 is a diagram explaining an effect of a retarding agent.

As a result, as shown in FIG. 5, a barrier of energy becomes large by a negative catalytic agent such as the chelate agent, Ta ion, or the organic acid, whereby a decomposition rate can be substantially zero. Therefore, a decomposition of the solute is hardly occurs even if a bound of HO—OH is unstable. On the other hand, in a case where the cooling water 11 contains a heavy metal, the barrier of energy becomes small whereby the decomposition rate increases. Accordingly, the solute is decomposed into $H_2O$ and $O_2$. Thus, the cooling water 11 includes no heavy metal preferably.

Figure 6:
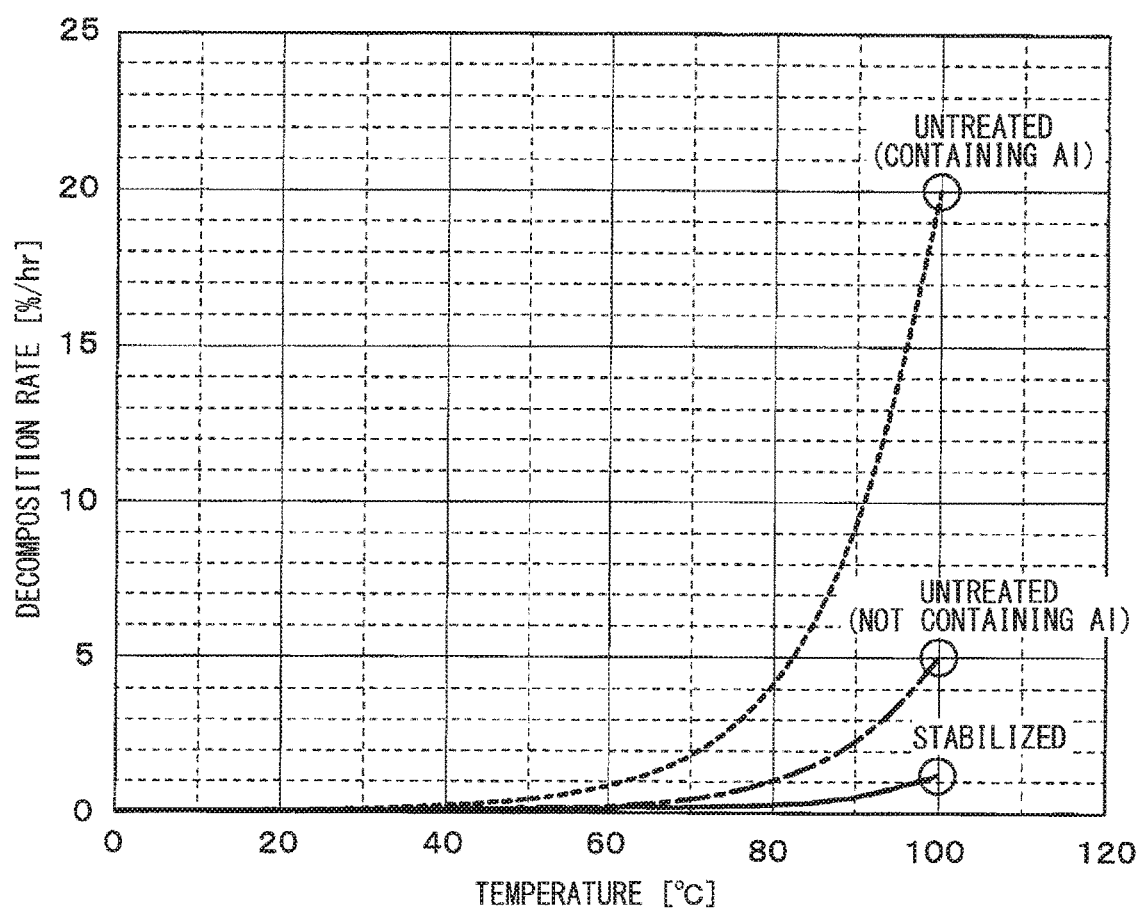
FIG. 6 is a diagram illustrating a correlative relationship between a temperature of the cooling water and a decomposition rate.

The inventors of the present disclosure conducted acceleration experiments that the cooling water 11 containing $H_2O_2$, a concentration of which in the cooling water 11 is 30%, is heated at 100° C. FIG. 6 shows the results. The decomposition rate of the cooling water 11 containing Al as a heavy metal is faster than the decomposition rate of the cooling water containing no Al. In contrast, the decomposition rate of the cooling water 11, which is stabilized by adding, as the retarding agent, the chelate agent of which concentration in the cooling water 11 is 4%, is twentieth part of the decomposition rate of the cooling water 11 which is not treated and does not or does contain Al. Thus, the decomposition of the solute becomes harder to occur by adding the retarding agent to the cooling water 11.

The cooling water 11, the radiator 13, and the pump 15 correspond to a heat transfer medium, a heat exchanger, and a transfer part of the present disclosure respectively.

(Modifications)

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

The configuration of the heat transfer system and the structure of the cooling water 11 of the above-described embodiment is an example and may be modified.

For example, the molecular structure of the solute, may be a structure expressed by the following chemical formula (2).

[Chemical Formula 2]

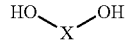

(2)

In the chemical formula (2), "X" connecting two hydroxyl groups represents one of a carbon, silicon, and sulfur. Since the two hydroxyl groups are connected to each other through "X", a length of the binding chain of the solute becomes longer as compared to that having no "X" whereby a stability of the bond of the solute can be improved.

The invention claimed is:

1. A heat transfer system comprising:
an energy converter that converts an energy of an energy source into an energy in a different state and generates a heat while converting the energy;
a heat transfer medium that is in a liquid state and receives the heat from the energy converter;
a transfer part that circulates the heat transfer medium; and
a heat exchanger that dissipates the heat from the heat transfer medium, which flows from the transfer part, to an outside of the heat transfer system, wherein
the heat transfer medium contains at least $H_2O$ and a solute that is compatible with the $H_2O$,
the solute has a molecular structure that includes at least two hydroxyl groups, and
a length of a binding chain between an oxygen atom of one of the two hydroxyl groups and an oxygen atom of an other of the two hydroxyl groups is shorter than a length of a binding chain between two hydroxyl groups of an ethylene glycol molecule.

2. The heat transfer system according to claim 1, wherein the molecular structure is expressed by one of the following two chemical formulas, and
X connecting two hydroxyl groups represents one of a carbon, silicon, and sulfur

[Chemical Formula 1]

HO—OH    (1)

[Chemical Formula 2]

    (2)

3. The heat transfer system according to claim 1, wherein a concentration of the solute in the heat transfer medium is 30 wt % or greater.

4. The heat transfer system according to claim 1, wherein the heat transfer medium contains a retarding agent that retards a decomposition reaction of the solute.

5. The heat transfer system according to claim 4, wherein the molecular structure is expressed by the following chemical formula, and
the retarding agent is an OH-radical scavenger,

[Chemical Formula 3]

HO—OH    (1).

6. The heat transfer system according to claim 5, wherein a concentration of the retarding agent is one-tenth of the concentration of the solute or smaller.

* * * * *